Feb. 11, 1930.  J. W. LEGG  1,746,661
METHOD OF AND APPARATUS FOR CONTROLLING VIBRATORY SYSTEMS
Filed April 11, 1927  4 Sheets-Sheet 1
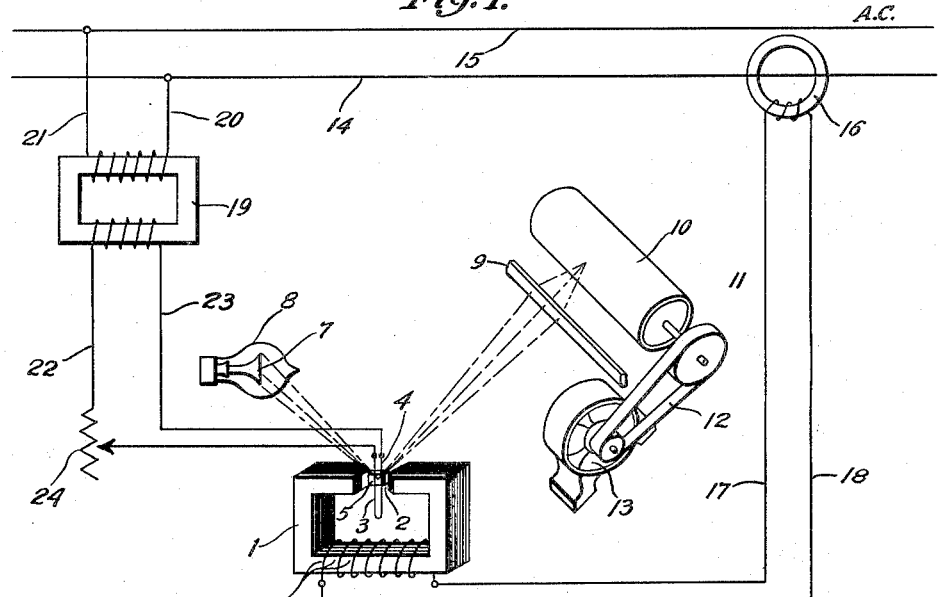
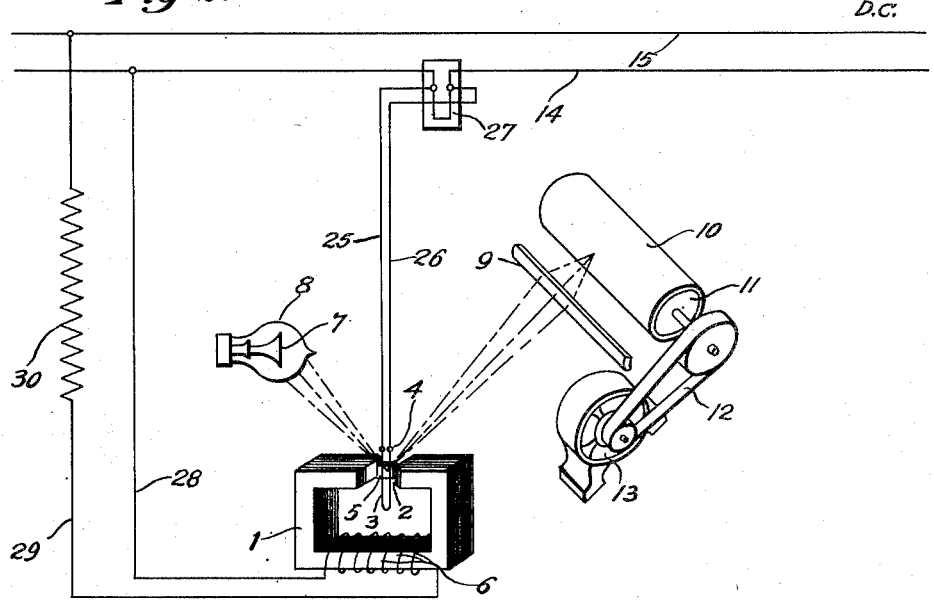
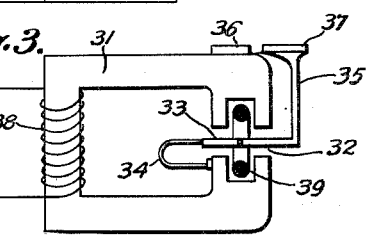
WITNESSES:
INVENTOR
Joseph W. Legg
BY
ATTORNEY Feb. 11, 1930.  J. W. LEGG  1,746,661
METHOD OF AND APPARATUS FOR CONTROLLING VIBRATORY SYSTEMS
Filed April 11, 1927  4 Sheets-Sheet 2

WITNESSES:

INVENTOR
Joseph W. Legg
BY
ATTORNEY

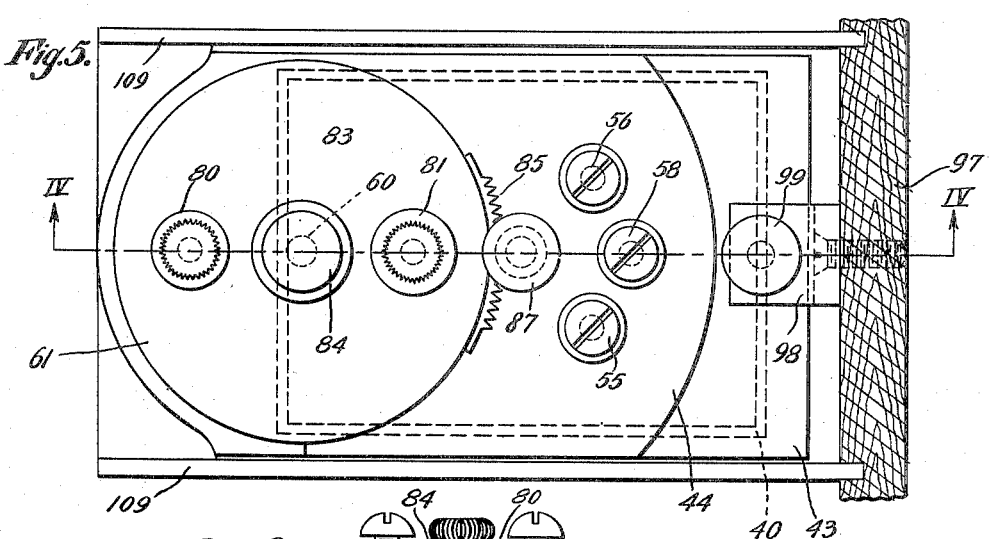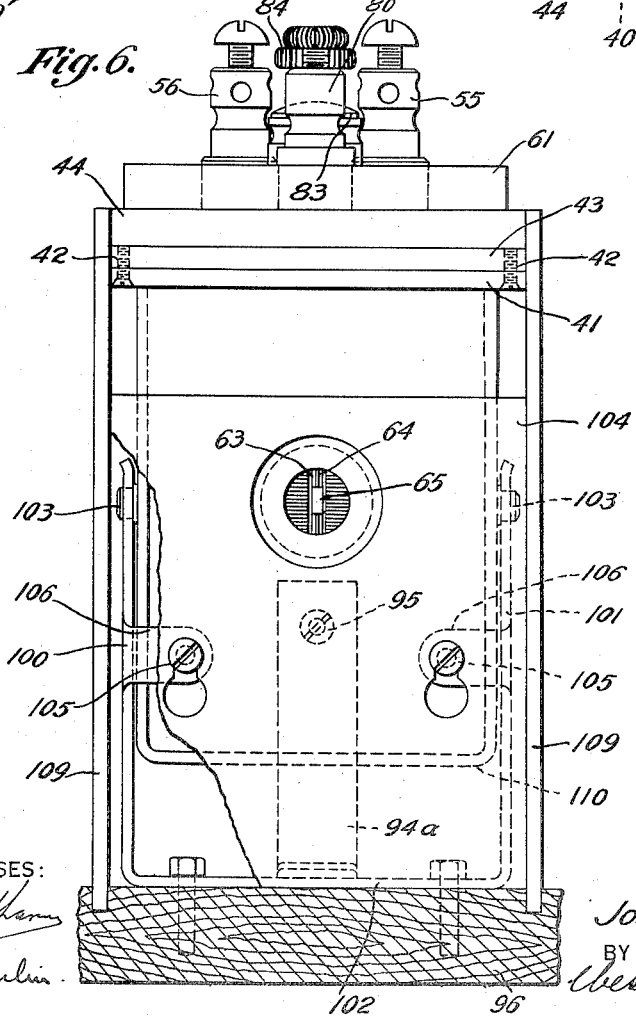

Feb. 11, 1930.   J. W. LEGG   1,746,661
METHOD OF AND APPARATUS FOR CONTROLLING VIBRATORY SYSTEMS
Filed April 11, 1927   4 Sheets-Sheet 4
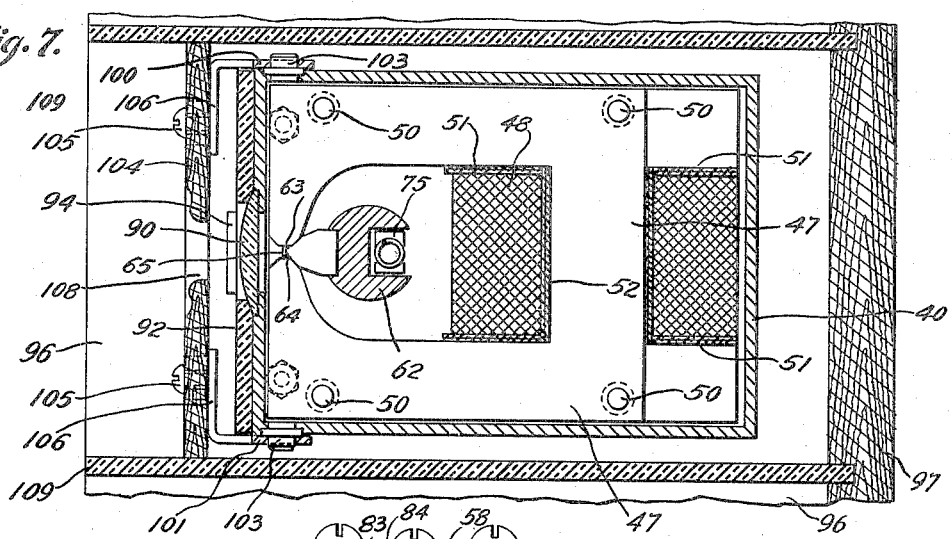
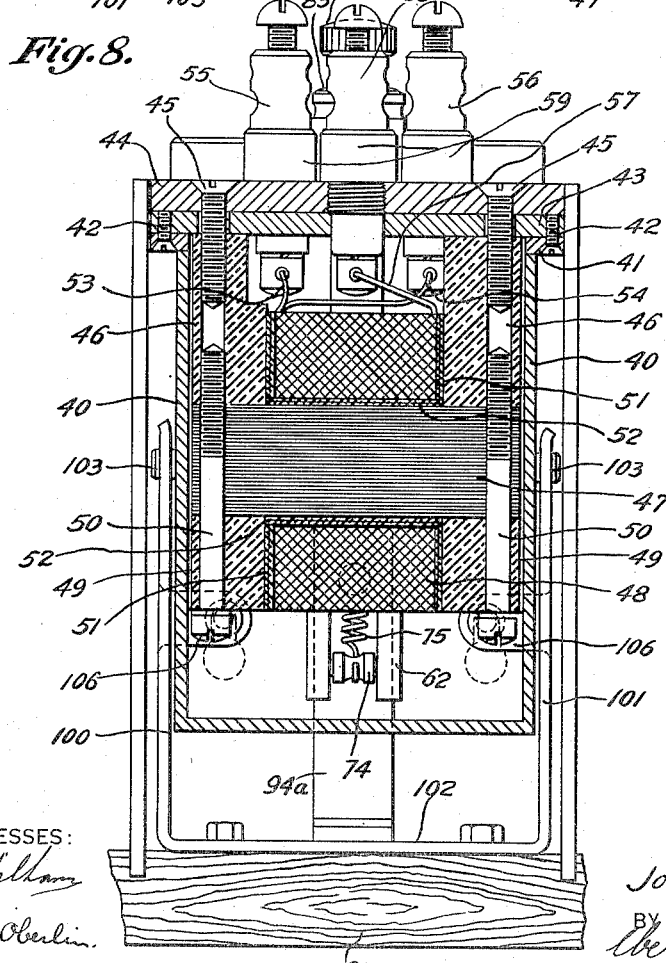
WITNESSES:
INVENTOR
Joseph W. Legg.
BY
ATTORNEY

Patented Feb. 11, 1930

1,746,661

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

METHOD OF AND APPARATUS FOR CONTROLLING VIBRATORY SYSTEMS

Application filed April 11, 1927. Serial No. 182,653.

My invention relates to methods of and apparatus for actuating a member, as one included in the vibratory system of a galvanometer.

In accordance with my invention, a vibratory system, as aforesaid, is actuated by a plurality of factors jointly contributing to the production of another factor.

More particularly, in accordance with my invention, the vibratory system of a galvanometer is actuated or deflected by a plurality of electrical currents maintained proportional, respectively, to the current and electromotive force of a circuit, whereby there is obtained an indication of the instantaneous magnitude of the electrical power or watts of the circuit.

In accordance with one application of my invention, galvanometer structure is provided comprising magnetizable members forming a flux gap in which is disposed one or more current-carrying conductors having a light-reflecting mirror secured thereto, the aforesaid magnetizable members having a coil associated therewith by which the magnetic flux in the gap may be varied.

Further, in accordance with my invention, the aforesaid magnetizable members and coil may be suspended on insulating members carried by the cover of a container in which the various parts of the galvanometer mechanism are enclosed, and, preferably, to render the vibratory system substantially equally responsive to frequencies ranging up to 6000 cycles per second, more or less, the container may be filled with a suitable medium, as a high-grade paraffine oil.

My invention resides in the method and apparatus of the character hereinafter described and claimed.

For an understanding of my method and for an illustration of some of the forms my apparatus may take, reference is to be had to the accompanying drawings, in which—

Figures 1 and 2 are diagrammatic views of an oscillograph system constructed in accordance with my invention;

Fig. 3 is a diagrammatic elevational view of a modified form of galvanometer mechanism;

Fig. 5 is a plan view of the mechanism shown in Fig. 4;

Fig. 6 is an end view of the mechanism shown in Fig. 4;

Fig. 7 is a transverse horizontal sectional view taken on the line VII—VII of Fig. 4, looking in the direction of the arrows; and Fig. 8 is a transverse vertical sectional view taken on the line VIII—VIII of Fig. 4, looking in the direction of the arrows.

Figure 4:
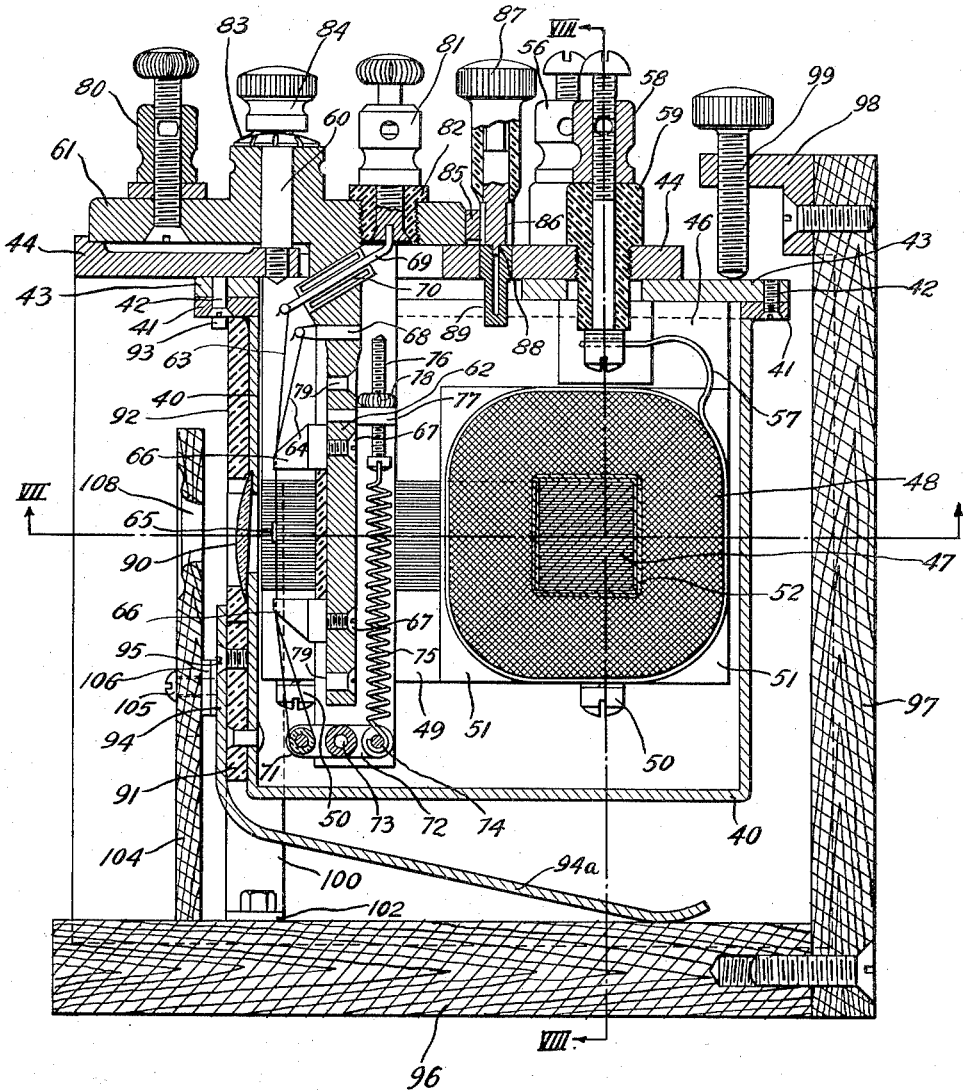
Fig. 4 is a vertical sectional view of a commercial form of galvanometer mechanism and is taken substantially on the line IV—IV of Fig. 5, looking in the direction of the arrows.

In Fig. 1, is illustrated galvanometer mechanism comprising a magnetic circuit 1 which is preferably a laminated structure substantially rectangular in configuration and having spaced pole faces forming a flux gap 2. As shown, a pair of parallel conductors 3 and 4 mounted for oscillatory movement, as well understood in the art, and extending into, or through, the gap 2 have a mirror 5 cemented or otherwise suitably secured thereto. Coacting magnetically with the laminated structure 1 is the coil or winding 6.

A beam of light emanating from any suitable source, such as the filament 7 of an electric lamp 8, passes to the mirror 5 by which it is reflected through a condensing lens 9 and arrives, substantially as a point of light, at viewing or recording structure of any suitable character. As herein illustrated, the last named structure is of the recording type and, hence, may comprise a light-sensitive film or surface 10 mounted on a drum or cylinder 11 to which rotation may be imparted in any suitable manner, as by a belt 12 driven by a motor 13. As will be obvious, the source of light 7, the mirror 5 and the light-sensitive surface 10 may be disposed within a suitable light-proof housing.

The laminated structure 1 should be formed of material, incapable, to any substantial extent, of becoming permanently magnetized.

A magnetic material having this property is described in U. S. Patent No. 1,454,878 issued to T. D. Yensen, May 15, 1923. Hence, when its winding 6 is energized, magnetic flux passes across the gap 2 and the density thereof, under saturation values, is proportional to the magnitude of the current traversing the winding 6. Since, adjacent ends of the conductors 3 and 4 are connected together, current flowing from the circuit in which they are included, passes along one of them in one direction and then along the other in reverse direction setting up magnetic fields angularly related to the field across the gap 2, whereby deflecting or vibratory movement is imparted to the conductors 3, 4 and the thereto-secured mirror 5. As a result, the reflected beam of light moves axially of the drum 11 proportionately to the relative magnitudes of the current traversing the conductors 3, 4 and the flux density in the gap 2.

In accordance with my invention, the currents cooperating to produce deflection of mirror 5, as aforesaid, may be maintained proportional, respectively, to the magnitudes of a plurality of factors, as quantities, electrical or otherwise, jointly contributing to the production of another factor, the magnitude of which is dependent upon the magnitudes of said first named factors.

Thus, mirror 5 may be actuated or deflected in accordance with the instantaneous magnitudes of the electrical power or watts of a system by producing currents in the conductors 3, 4 and the winding 6, the magnitudes of which currents are maintained proportional, respectively, to the electromotive force and current of the system. Such an arrangement is illustrated in Fig. 1 in connection with a circuit comprising the conductors 14 and 15, which circuit is traversed by alternating current.

To produce a current proportional to the line current, one of the aforesaid conductors, for example, conductor 14 may serve as the primary winding for a current transformer 16, the secondary winding of which is connected by the conductors 17 and 18 to the terminals of coil 6. To produce a current proportional to the electromotive force across the line, the primary winding of a voltage transformer 19 may be connected by conductors 20 and 21 to the respective conductors 14 and 15. The secondary winding of transformer 19 is connected by conductors 22 and 23 to the conductors 3 and 4. Ordinarily, a resistance 24, preferably adjustable, should be included in the circuit of conductors 22 and 23 to maintain the current in the conductors 3 and 4 in phase with the line voltage.

In the form of my invention shown in Fig. 1, the current traversing the winding 6 is maintained proportional to the current flowing in the circuit comprising the conductors 14 and 15. Accordingly, the flux density in the gap 2 varies in accordance with the line current. At the same time, the current traversing the conductors 3 and 4 varies with the voltage across the line conductors 14 and 15. It follows, then, that the mirror 5 is vibrated in accordance with the instantaneous magnitudes of the electrical power transmitted by the conductors 14 and 15, and by imparting rotative movement at suitable speed to the light-sensitive surface 10, a record may be obtained indicative of the instantaneous magnitudes of the electrical power or watts.

In Fig. 2, an arrangement is shown wherein the line conductors 14 and 15 are utilized for transmitting direct current. Under such circumstances, it is desirable that the conductors 3 and 4, which serve as a support for the vibratory mirror 5, be traversed by a current proportional to the line circuit. To this end, said conductors 3 and 4 may be connected to the respective conductors 25 and 26, which, in turn, are connected across a substantially non-inductive shunt 27 in one of the line conductors.

Furthermore, the field winding 6, in direct current work, should be energized by a current proportional to the electromotive force across the line and, hence, its terminals may be connected by the conductors 28 and 29 to the respective line conductors 14 and 15. In addition, a resistance 30, similar in function to the resistance 24, should be included in the circuit of conductors 28 and 29. The voltage drop in resistance 30 should be great compared with that in winding 6 in order that the current in the conductors 28 and 29 may be proportional to the voltage across the line circuit.

In Fig. 3, there is illustrated a modified type of galvanometer mechanism comprising the preferably laminated structure 31 of material incapable of being permanently magnetized. Disposed within the gap 32 between adjacent pole faces of the structure 31 is a pivoted reed or armature 33 normally maintained in substantially the position indicated by a leaf spring 34, or the like. Secured to the armature 33 is a member 35 supported for oscillatory movement on a member 36. Carried by the member 35 and partaking of its oscillatory movement is the mirror 37 to which a light beam is directed and by which said beam is reflected to suitable indicating or recording mechanism.

Coacting magnetically with the laminated structure 31 is the field coil or winding 38 utilizable for establishing a magnetic field in the gap 32. Disposed preferably in aligned bifurcations in the pole faces of said laminated structure 31 is a coil or winding 39, which, when energized, modifies or changes the action of the aforesaid magnetic field on the armature 33.

The device illustrated in Fig. 3 operates substantially as do the generally similar devices shown in Figs. 1 and 2. Coil 39 is generally the equivalent of the conductors 3 and 4 and, in conjunction with coil 38, functions to actuate armature 33 in accordance with the relative magnitudes of the currents traversing said coils 38 and 39.

In Figs. 4 to 8, is illustrated one type of galvanometer mechanism utilizable for performing the functions hereinbefore described. As shown, a casing or container 40 of suitable non-magnetic material, as brass, has a metallic member 41 soldered or otherwise suitably secured thereto. However, under some circumstances, it may be desirable to form casing 40 and member 41 integral with each other. Suitably secured to the member 41, as by screws 42, is a metallic plate or member 43.

Disposed on the plate 43 is a second metallic plate 44 receiving a plurality of screws 45 (Fig. 8) which extend through openings in plate 43 of greater diameter than that of said screws. Blocks 46 of suitable insulating material, as a phenol condensation product, are disposed adjacent each side of casing 40, and the aforesaid screws 45 are threaded thereinto. A stack of laminations 47 having a coil or winding 48 disposed on one section thereof is received between the blocks 46 on the one hand and a substantially similar pair of blocks 49 on the other hand, Fig. 8. Screws 50 passing through the blocks 49, laminations 47, and into the blocks 46 serve to maintain the various parts in assembled relation.

Disposed in the space between the sides of the aforesaid coil 48 and the adjacent inside surfaces of the laminations 47 and the respective blocks 46 and 49 are the strips or layers 51 of suitable sheet-like insulating material. Similarly, insulating sheets 52 are disposed between adjacent surfaces of coil 48 and the laminations 47, Fig. 8.

Ordinarily, the aforesaid parts are assembled by suitably winding the coil 48 on the stack of laminations 47 having first placed the insulating sheets 52 in position. Then, after the insulating strips 51 are properly positioned, the pairs of blocks 46 and 49 are secured to the coil and laminations by the screws 50. Thereupon, the combined structure is passed within the casing 40 and the screws 45 are threaded into the blocks 46. In this manner, the various parts are securely positioned within the casing, while at the same time a liquid-tight joint is effected between the plates 41 and 43.

It is desirable that the aforesaid coil 48 be so arranged that a part only, or all, of its convolutions may be included in the external circuit. To this end, as indicated in Fig. 8, the ends or terminals 53 and 54 of the said coil 48 may be connected to the respective binding posts 55 and 56. A third terminal 57 connected to coil 48 intermediate its end-terminals leads to a binding post 58. Between one end-terminal of said coil 48 and the terminal 57, there may be included any desired fraction of the total number of coil-convolutions. Usually, it is desirable that terminal 57 be so connected to coil 48 that the number of turns on either side bears the ratio of one-sixth to five-sixths.

The aforesaid binding posts 55, 56 and 58 respectively extend through aligned openings in the plates 43 and 44 to a region exteriorly of the casing 40. Each binding post comprises a bushing 59 of insulating material threaded into one of said openings in the plate 44. Because of this arrangement, all of said binding posts are insulated from each other and from the metallic plate 44 while, at the same time, a liquid-tight joint is effected between said plate 44 and each bushing 59.

In Fig. 4, is illustrated a stub shaft or member 60 with respect to which a disk or member 61 is rotatably mounted. Projecting laterally and downwardly from disk 61, as viewed in Fig. 4, and preferably formed integrally therewith is a stem or support 62 for the vibratory system which, in the example illustrated, comprises a pair of conductors 63 and 64 of suitable material having great tensile strength and low resistance, as a silver alloy in filamentary form, said conductors passing through the gap between spaced ends of the laminations 47. A light-reflecting mirror 65 is suitably secured, as by cement or the like, to the conductors 63 and 64. Projecting laterally from the stem 62 equidistantly from the mirror 65 are the supports 66, 66, of suitable insulating material, as ivory, and preferably detachably secured to said stem 62 by screws 67. Conductors 63 and 64 are disposed within suitably spaced slots or grooves formed in the outer surfaces of supports 66, 66.

As illustrated in Fig. 4, the upper end of conductor 64 is soldered or otherwise suitably secured to a conductive plug or post 68 projecting from and grounded on the stem 62. The upper end of conductor 63 is similarly secured to a conductive member 69 passing through a perforation in stem 62 but insulated therefrom by the member 70.

Conductors 63 and 64 are in effect one single conductor which, adjacent the bottom of container 40 is looped or passed around a cylindrical member 71 of suitable insulating material, as ivory, which is carried by a lever 72 pivoted at 73 in the bifurcated end of stem 62. Secured to a pin 74 at the other end of lever 72 is one end of a helical spring 75, the other end of which is secured to a screw 76 passing through a perforation in a member 77 projecting from stem 62. Threaded to screw 76 is a nut 78 which may be adjusted to vary the tension of spring 75 and thereby control the tension of conductors 63 and 64.

As illustrated in Fig. 4, the stem 62 may be provided with the perforations 79 equi-distantly spaced from the screws 67. Upon removal of the latter, supports 66, 66 may be removed from the position shown in Fig. 4, placed opposite the perforations 79 and held in that position by the same screws 67. In so doing, the sensitivity of the vibratory system is materially increased.

In the example shown, the conductors 63 and 64 are placed in the external circuit by the binding posts or terminals 80 and 81 both carried by the disk 61. Terminal 80 is conductively related to the disk 61. Terminal 81 is insulated from disk 61 by a bushing 82 but is connected to one end of the conductor 63 by the member 69.

Disposed on the member 60 and engaging the upper surface of disk 61 is a spring washer 83, Fig. 4, with which the head 84 of the screw 60 coacts, said head 84 being unitary with said member 60. Head 84, when properly adjusted, compresses washer 83 thereby applying pressure to disk 61 to hold it in intimate engagement with plate 44.

Rotation may be imparted to disk 61 and the thereto-connected vibratory system in any suitable manner. As illustrated, disk 61, has secured thereto a rack or gear-segment 85, Figs. 4 and 5, meshing with a pinion 86 having an actuating knob 87. Formed integrally with the pinion 86 is a stem 88 rotatably mounted in a member 89 disposed in fluid-tight relation with respect to the plate 44, preferably by being pressed into a perforation therein.

Upon actuation of pinion 86, disk 61 and the vibratory system associated therewith may be rotated in either direction, thereby adjusting the mirror 65 about a vertical axis and bringing the reflected beam of light into a desired position in a horizontal plane.

After disengagement of pinion 86 from rack 85 and removal of the integral members 60 and 84 and washer 83 from member 60, the disk 61 may be moved backwardly and then upwardly, Fig. 4, to withdraw stem 62 and the therewith-associated mechanism from the container 40. Before initial operation of the device and while the aforesaid parts are thus removed, a suitable medium, as a high grade paraffine mineral oil, for example, that known in the trade as "Nujol", should be poured thereinto. A medium of this character serves as a damping agent for the vibratory system and substantially eliminates the natural period thereof.

Opposite the mirror 65, the front wall of container 40 is provided with an opening covered by a condensing lens 90 suitably held in liquid-tight relation with respect to the outer surface of said front wall. For thus holding lens 90 in position, there may be utilized a plate 91 riveted or otherwise suitably secured to the lower portion of the front wall of container 40. Disposed above the plate 91 is a member 92, which should be a black body and a poor reflector, preferably of a phenol condensation product, and having an opening registering with the aforesaid opening in the front wall of casing 40. As shown, the inner surface of member 92, adjacent said opening, engages the outer peripheral surface of lens 90. Member 92, at its upper edge, is disposed between the front wall of container 40 and a plurality of abutments 93, Fig. 4, spaced from each other and from said front wall. The lower edge of member 92 is disposed between the lower front wall of casing 40 and a clamp 94 suitably secured, as by screws 95, to plate 91.

The above described galvanometer mechanism may be disposed within or upon a supporting structure of any suitable character. As one form of such structure, there may be utilized an angular frame comprising the members 96 and 97, the latter, at its upper end, Fig. 4, carrying a bracket 98 having a screw 99 threaded thereinto. Upstanding from the member 96, in a region removed from member 97, are the resilient arms 100 and 101 of a bracket 102. Each arm 100 and 101, adjacent its upper surface, comprises an opening received by a stud 103 carried by the casing 40.

The aforesaid clamp 94 preferably comprises a resilient tail or member 94ª extending beneath the casing 40 and at an angle with respect to its bottom surface.

The galvanometer mechanism may be disposed within the aforesaid supporting structure by first spreading the arms 100 and 101, inserting the front of container 40 therebetween, and then permitting said arms to move toward each other so that the studs 103 move into the respective openings at the ends of said arms 100 and 101. Thereupon, by adjustment of screw 99, the mirror 65 may be tilted around a horizontal axis to cause the light beam reflected therefrom to assume a desired position in a vertical plane.

As a light shield for the front of casing 40, there may be utilized a member 104 supported in any suitable manner, preferably by providing a plurality of key-shaped slots through each of which passes a screw 105, each of which is threaded into a flange or lug 106, one of which extends from each member 100 and 101. Obviously, when screws 105 are loosened, the member 104 may be moved upwardly, Fig. 6, until the enlarged portions of the key-shaped slots are registered with the heads of screws 105. Thereupon, said member 104 may be readily detached from its supporting structure.

When member 104 extends above the lens 90, as it usually does, it should be provided with a perforation 108 for the light beams passing toward and from the mirror 65.

Preferably, members 109 are disposed on each side of the galvanometer structure and are supported by the frame members 96 and 97.

The aforesaid frame members 96 and 97, the member 104, and the side members 109 may be constructed of any suitable material. Ordinarily, however, it is desirable that they be constructed of wood or, and preferably, of a phenol condensation product.

As heretofore stated, the structure illustrated in Figs. 4–8 constitutes one form of a device that may be utilized for performing the functions described in connection with Figs. 1–3. Obviously, coil 48 corresponds with coil 6. Coil 48 may be placed in the external circuit by connecting the same to the terminals 55 and 56. When so connected, all of the coil-convolutions are in circuit and this arrangement should be utilized when current is passed continuously, or for extended periods, therethrough. When said coil is to be energized momentarily or for short periods only by excessive currents, there should be utilized the terminal 58 in conjunction with that terminal 55 or 56 which places the smaller number of coil-convolutions in circuit.

Further, the conductors 3 and 4 of Figs. 1 and 2 correspond with the conductors 63 and 64 of Figs. 4–8. The latter are placed in the external circuit by connecting the same to the terminals 80 and 81, the circuit extending from the former terminal through the disk 61 and stem 62 to the post 68, and from the latter terminal through the conductor 69 insulated from said stem 62.

Still further, the laminations 47 correspond with the laminations 1 and should be formed of material substantially incapable of becoming permanently magnetized.

The winding 6 of Figs. 1 and 2, the winding 38 of Fig. 3, and the winding 48 of Fig. 4, in lieu of a connection to a circuit traversed by a varying current, may be connected across the terminals of a substantially constant source of current, for example, a battery having an electromotive force of 6 volts, more or less. With such an arrangement, the magnetic field in the air gap of the magnetizable members is maintained substantially constant. Hence, deflection of the vibratory system is proportional to the instantaneous magnitudes of the current traversing the actuated conductors and, when said current varies in accordance with the power circuit current or electromotive force, the device functions as an ammeter or voltmeter, as the case may be.

The inertia of a vibratory system of the character described herein is inconsequential and it may be so designed that it responds faithfully to frequencies ranging upwardly to 6000 cycles per second and even more.

I claim as my invention:

1. Galvanometer mechanism comprising a vibratory system freely responsive to frequencies of the order of 3000 cycles per second, and means for actuating said system in accordance with the magnitudes of a plurality of quantities jointly contributing to the production of another quantity.

2. Galvanometer mechanism comprising a vibratory system freely responsive to frequencies of the order of 3000 cycles per second, and means for actuating said system in accordance with the magnitudes of the current and electromotive force of a circuit.

3. Galvanometer mechanism comprising a vibratory system freely responsive to frequencies of the order of 3000 cycles per second, and means for maintaining a plurality of currents proportional, respectively, to a plurality of quantities jointly contributing to the production of another quantity, and means for actuating said system by the joint action of said currents.

4. Galvanometer mechanism comprising magnetizable structure of a magnetic circuit, said structure being incapable, to any substantial extent, of becoming permanently magnetized, a vibratory system included in said circuit, and means for actuating said system by the conjoint action of magnetic fields maintained proportional, respectively, to a plurality of quantities jointly contributing to the production of another quantity.

5. Galvanometer mechanism comprising magnetizable structure of a magnetic circuit, said structure being incapable, to any substantial extent, of becoming permanently magnetized, a vibratory system included in said circuit, and means for actuating said system by the conjoint action of magnetic fields maintained proportional, respectively, to the current and electromotive force of a circuit.

6. Galvanometer mechanism comprising magnetizable members of a magnetic circuit, said structure being incapable, to any substantial extent, of becoming permanently magnetized, a vibratory system including a current-carrying conductor in said circuit, and means for maintaining a plurality of currents proportional, respectively, to a plurality of quantities jointly contributing to the production of another quantity, one of said currents traversing said conductor and another coacting with said magnetizable members to produce coacting magnetic fields for actuating said vibratory system.

7. Galvanometer mechanism comprising a container, a cover detachable therefrom, members of insulating material depending from said cover adjacent the container side walls, other members of insulating material spaced from said first named members, and magnetizable members clamped between said first and second named members.

8. The combination with a container for galvanometer mechanism, of a support for said container comprising a base, members upstanding from said base and between which said container is disposed, and means for rotatably securing said container to said members.

9. The combination with a container for galvanometer mechanism, of a support for said container comprising a base, resilient members upstanding from said base and between which said container is disposed, and means for rotating said container while supported by said members.

10. The combination with a container for galvanometer mechanism, of a support for said container comprising a base, members upstanding from said base and between which said container is disposed, means for rotatably securing said container to said members, and a resilient member interposed between said container and base.

11. The combination with a container having an opening and a lens covering said opening, of a support for said container comprising a base, members upstanding from said base and between which said container is disposed, means for detachably and rotatably securing said container to said members, and a resilient member interposed between said container and base, an extension of said resilient member serving as a clamp to hold said lens on said container.

12. The combination with a container for galvanometer mechanism, of a support for said container comprising a base, a member upstanding from said base, and a light-shielding plate for said container detachably carried by said member.

13. The combination with a container for galvanometer mechanism, of a support for said container comprising a base, a member upstanding from said base, a light-shielding plate for said container, and means comprising a key-shaped slot for detachably associating said plate with said member.

14. The combination with the magnetizable structure of a magnetic circuit including a flux gap, of a coil coacting with said structure to develop a magnetic field in said gap, a second coil for modifying said magnetic field, means for producing in said coils currents proportional, respectively, to the current and electromotive force of a circuit, and means for maintaining the current in the electromotive force coil in phase with the electromotive force across said circuit.

15. The combination with the magnetizable structure of a magnetic circuit including a flux gap, of a coil coacting with said structure to develop a magnetic field in said gap, a second coil for modifying said magnetic field, means for producing in said coils currents proportional, respectively, to the current and electromotive force of a circuit, and means comprising a resistance in series with the electromotive force coil for maintaining the current in said coil in phase with the electromotive force across said circuit.

16. Galvanometer mechanism comprising magnetizable members forming a flux gap, a vibratory system including parallel current-carrying conductors in said flux gap, and means for maintaining a plurality of currents proportional, respectively, to a plurality of quantities jointly contributing to the production of another quantity, one of said currents traversing said conductors and another coacting with said magnetizable members to produce coacting magnetic fields for actuating said vibratory system.

17. Galvanometer mechanism comprising magnetizable members forming a flux gap, a vibratory system including tensioned current-carrying conductors in said flux gap, a light-reflecting mirror carried by said conductors, and means for maintaining a plurality of currents proportional, respectively, to a plurality of quantities jointly contributing to the production of another quantity, one of said currents traversing said conductors and another coacting with said magnetizable members to produce coacting magnetic fields for actuating said vibratory system.

18. Galvanometer mechanism comprising a vibratory system freely responsive to frequencies of the order of 3000 cycles per second, and means for actuating said system in accordance with the magnitudes of a plurality of varying magnetic fields.

In testimony whereof, I have hereunto subscribed my name this 9th day of April, 1927.

JOSEPH W. LEGG.